May 3, 1938.     J. M. W. CHAMBERLAIN     2,116,099
SEALING, SUPPORTING, AND CUSHIONING ASSEMBLY
Filed Sept. 4, 1936
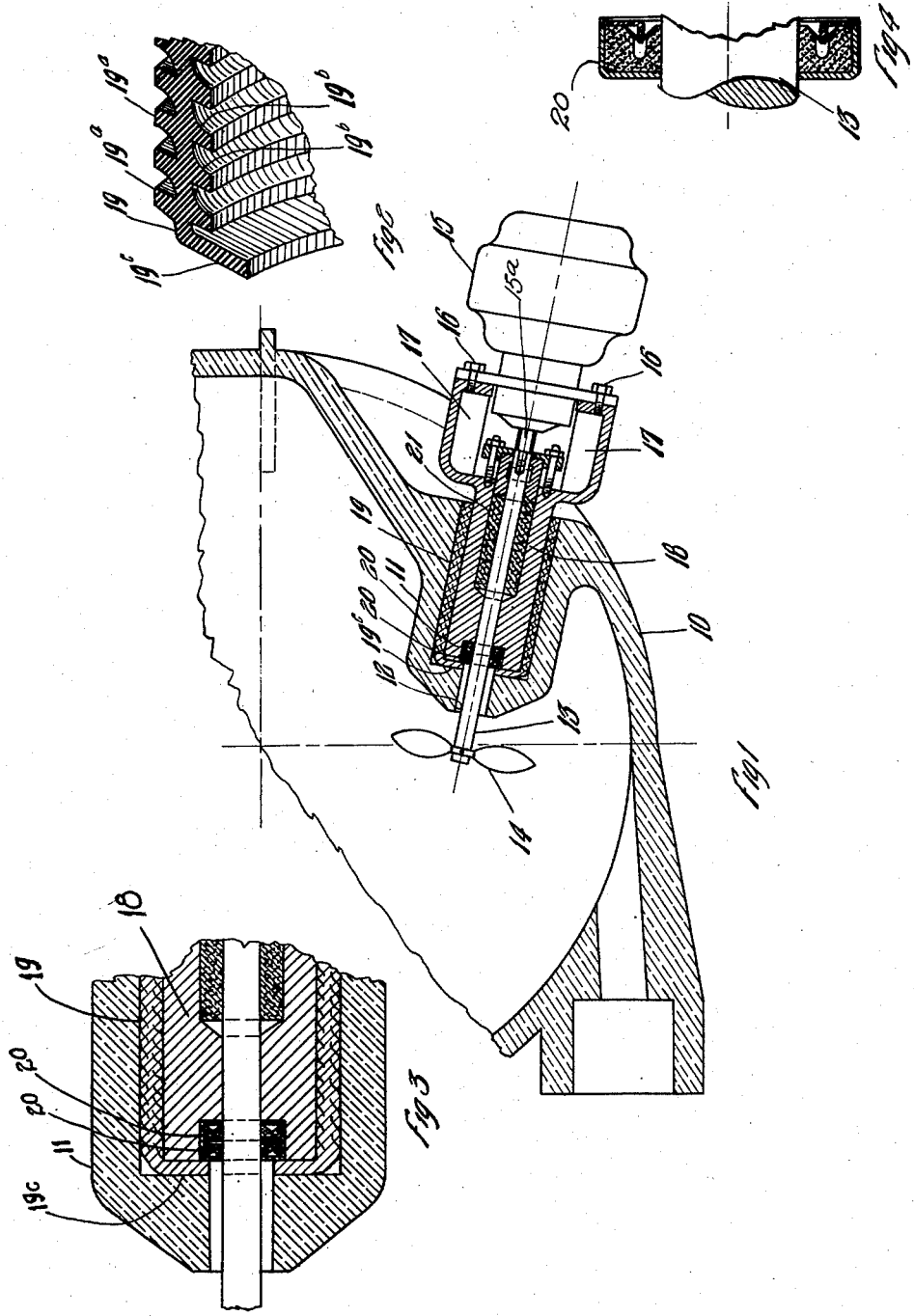
INVENTOR
JAMES M W CHAMBERLAIN
BY
Willard D. Eakin
ATTORNEY Patented May 3, 1938

2,116,099

UNITED STATES PATENT OFFICE 2,116,099

SEALING, SUPPORTING, AND CUSHIONING ASSEMBLY

James M. W. Chamberlain, Silver Lake, Ohio, assignor to United States Stoneware Company, Akron, Ohio, a corporation of Ohio Application September 4, 1936, Serial No. 99,425

3 Claims. (Cl. 248—26)

This invention relates to assemblies in which a device or mechanism requires to be mounted and supported in an aperture extending through a wall of a container, with a part of the device or mechanism sealed to the walls of the aperture to prevent escape of the fluid from the container.

In the assembly of the accompanying drawing, for example, a motor is supported by the wall of the container with its shaft extending to the interior of the container and there having mounted upon it a bladed impeller for stirring or circulating a fluid in the container.

My chief objects are to provide improved means for so supporting the device or mechanism; to provide against breakage of the container in the assembling of the parts and in the handling of the assembly in case the container is of frangible material, such as the glass or ceramic material extensively used in the chemical industry; to provide an improved cushion support for the device or mechanism and at the same time provide a seal even though the sealing member is required to withstand, in addition to the fluid pressure, another displacing force such, for example, as the reaction force of the impeller in the assembly of the accompanying drawing.

Of the accompanying drawing:

Fig. 1 is a vertical section of an assembly embodying my invention in its preferred form as applied to a motor-and-impeller assembly for stirring or circulating a fluid in a frangible container, a part of the container being broken away for economy of space in the drawing.

Fig. 2 is a fragmentary, sectional-perspective view of the sealing, supporting and cushioning member which is used in this preferred assembly.

Fig. 3 is a section of parts as shown in Fig. 1 but on a larger scale.

Fig. 4 is a section of parts as shown in Fig. 1 but on a larger scale.

Referring to the drawing, the container, 10, is formed with an inwardly extending hollow boss 11 having an aperture 12 in its inner end wall for accommodating with substantial clearance as shown the shaft 13 of a marine-type impeller 14.

The motor, 15, is secured, as by means of cap screws 16, 16, to the two arms 17, 17 of a forked or yoke-like member 18 having a preferably cylindrical stem portion supported within the hollow boss 11 by a sealing supporting and cushioning member 19.

The shaft, 15ᵃ, of the motor has threaded connection with the shaft 13 of the impeller, as shown, and the latter is sealed to the stem of the member 18 by means of sealing rings 20, 20 and a packing gland 21 of well known construction.

The sealing member 19 is formed of a material adapted to withstand the action of the particular chemical or chemicals to be dealt with but having substantially the physical properties of soft or semi-hard vulcanized rubber, such rubber being suitable for some chemicals and polymerized vinyl chloride, for example, being better adapted to withstand the action of other chemicals.

The sealing member 19 is shown in its unstrained condition in Fig. 2. Preferably it is molded as an endless ring having on its outer side a series of annular flanges 19ᵃ, 19ᵃ inclined in a direction such that they will easily bend to more inclined positions as the sealing member is forced into the hollow boss 11, and having on its inner side a series of annular flanges 19ᵇ, 19ᵇ inclined in a direction such that they will easily bend to more inclined positions as the member 18 is forced into the sealing member after the latter is mounted in the boss, or as the sealing member is forced onto the member 18 before the latter is mounted in the boss, in case that order of assembly is preferred.

A sealing ring having the two sets of flanges just mentioned is shown, in a substantially different type of assembly, with a different mode of operation for the inner flanges 19ᵇ, and with only a sealing function, in Nathan U. S. Patent No. 2,032,492, but so far as I am aware I am the first to employ such a ring or any similar ring in an assembly comprising a frangible container and a device or mechanism required to be mounted in a wall of a container and be supported thereby, to be in communication with both the interior and the exterior of the container, and to withstand a displacing force such as the fluid pressure acting upon the entire cross-section or projected cross-sectional area bounded by the outer circumference of the sealing member, either with or without an additional force such as the reaction force of the impeller of the present drawing; or to employ such a ring for both shock-absorbing and sealing purposes.

Preferably the sealing member is formed at its inner end with an annular flange 19ᶜ extending radially inward and adapted to be embraced between the inner end-face of the member 18 and the adjacent surface of the end-wall of the boss, to cushion and prevent breakage of the frangible material of the boss in violent forcing of the member 18 into position, which is likely to end in substantial shock because of the comparatively low resistance which the inclined flanges oppose to the movement of the member 18 into position, and to prevent contact of the two rigid members during use of the device, which would be likely to cause noisy operation and chipping or breaking of the boss by reason of the vibration of the motor-impeller assembly.

In the use of the assembly as described, both the outer flanges 19a and the inner flanges 19b act as pawls or moving struts, cramping against the inner face of the boss and the outer face of the member 18, respectively, to resist displacement of the motor assembly and sealing ring by the pressure of the fluid within the container, which in the present case has added to it the reaction force of the impeller, and this cramping force of the flanges against the respective surfaces contacted provides a strong compression seal against the escape of fluids, which becomes the stronger as the force of the fluid is increased, as by increasing the head of liquid in the container or as in the development of high gas pressure in the container.

The assembly as described admirably attains the objects above set out.

I claim:

1. The combination of a rigid hollow member having an aperture from its interior to its exterior requiring to be sealed against the passage of fluid therethrough, a device mounted, and requiring to have cushioned support, in said aperture, and a resilient sealing and supporting member mounted between the device and the walls of the aperture, the device and the sealing and supporting member fully closing the aperture and the device substantially being wholly supported by the sealing and supporting member, and the sealing member being formed on at least one of its faces with flanges so formed as to act as pawls and solely thereby prevent displacement of the device by fluid pressure within the hollow member.

2. A combination as defined in claim 1 in which the sealing and supporting member is formed on both its inner face and its outer face with flanges as defined.

3. A combination as defined in claim 1 in which the hollow member is of rigid chemically resistant but frangible material and the device is a motor support.

JAMES M. W. CHAMBERLAIN.